Feb. 23, 1971   P. J. McGANNON   3,564,760
OPTICAL ILLUSION TOY

Filed Jan. 21, 1969                                2 Sheets-Sheet 1

INVENTOR.
PATRICK J. McGANNON

Feb. 23, 1971  P. J. McGANNON  3,564,760
OPTICAL ILLUSION TOY

Filed Jan. 21, 1969  2 Sheets-Sheet 2

*INVENTOR.*
PATRICK J. McGANNON

United States Patent Office 3,564,760
Patented Feb. 23, 1971

3,564,760
OPTICAL ILLUSION TOY
Patrick J. McGannon, 2797 Stevens St.,
Oceanside, N.Y. 11572
Filed Jan. 21, 1969, Ser. No. 792,870
Int. Cl. A63h 1/24
U.S. Cl. 46—47
6 Claims

ABSTRACT OF THE DISCLOSURE

A pair of transparent members are mounted co-axially for opposite rotation. One of the members has a plurality of generally parallel or radial lines slanted in one direction and the other member has a plurality of corresponding lines slanted in the opposite direction. The members may be rings, discs, or possibly other shaped members. The members are rotated oppositely and when they are rotated oppositely, a viewer looking through the members receives the illusion or impression of motion, for instance, rising or falling motion, or side motion.

---

This invention relates to an optical illusion toy device.

More specifically, the invention relates to a pair of transparent members mounted co-axially for opposite rotation. One of the members has a plurality of parallel lines slanted in one direction and the other member has a plurality of lines slanted in the opposite direction. The members may be rings, discs, or other shaped members.

The members are rotated in opposite directions and when they are rotated oppositely, a viewer looking through the members receives the illusion or impression of motion, for instance, rising or falling motion, or side motion.

Accordingly, a principal object of the invention is to provide new and improved optical illusion toy means.

Another object of the invention is to provide new and improved optical illusion toy means having a pair of oppositely spinning transparent members, each member having a plurality of lines which are neither parallel or radial and the lines are arranged so that the lines of one member will cross the lines of the other member, whereby when the members are spun in opposite directions, an illusion of movement is created.

Another object of the invention is to provide a new and improved optical illusion toy device comprising a transparent member having a plurality of opaque lines slanted in one direction and a second transparent member having a plurality of opaque lines slanted in a direction opposite to the lines of said first member, means to mount said member co-axially and rotatably, and means connected to rotate said members in opposite directions.

These and other objects of the invention will be apparent from the following specification and drawings of which:

Figure 1:
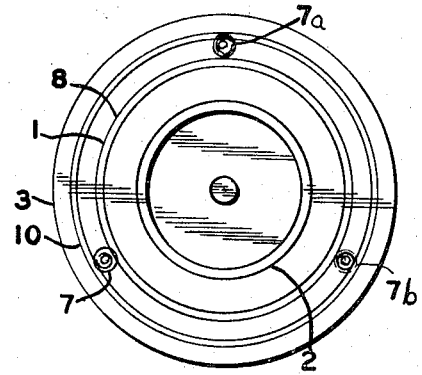
FIG. 1 is a top view of an embodiment of the invention using ring members.
Figure 2:
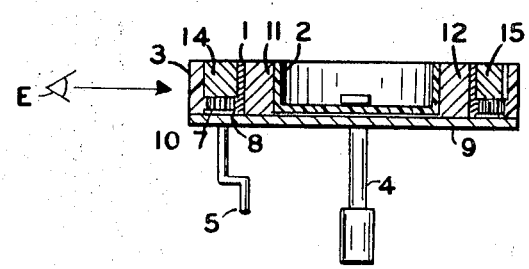
FIG. 2 is a side view partially in section of the embodiment of FIG. 1.
Figure 2A:
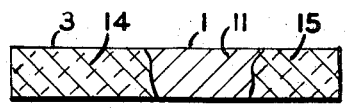
FIG. 2A is a detail view of FIG. 2.

Referring to FIGS. 1 and 2, the invention comprises an inner ring member 1, and a stationary center ring 2 and an outer ring member 3. The center ring member 2 is fixedly connected to a shaft handle 4. The rings 1 and 3 are rotatably mounted on shaft 4. Center ring 2 and bottom plate 9 are fixed to shaft 4. The handle 4 is held to hold the device with one hand while operating crank 5 with the other hand.

The rotational movement is provided by means of the gear 7 which is connected to the spinner 5. The gear 7 meshes with an internal ring gear 10 on the lower internal lip of the ring member 3, and an external ring gear 8 on ring 1. Idler gears 7a and 7b are provided.

Both of the ring members are preferably of transparent material such as plastic. The inner ring member 1 has a plurality of parallel opaque lines 11, 12, etc. which are slanted in one direction and the outer member 3 has a plurality of parallel slanted opaque lines 14, 15, etc., which are slanted in the opposite direction across the lines 11, 12, etc.

In operation, when the device is held in one hand by means of the handle 4, the rings 1 and 3 are oppositely rotated by the spinner 5 and/or pushing outer member 3 in the opposite direction, thereby imparting spinning motion to the two discs in opposite directions due to the gearing. Therefore, when the device is spinning, the eye E of the observer will see a repeatedly changing pattern of the crossed lines which gives an optical illusion or impression of motion, up, side, or down, which illusion may be varied by changing the speed of the rotation.

Alternatively, the lines may be of different colors to add a color dimension to the illusion, with various changing color patterns.

Figures 3, 4:
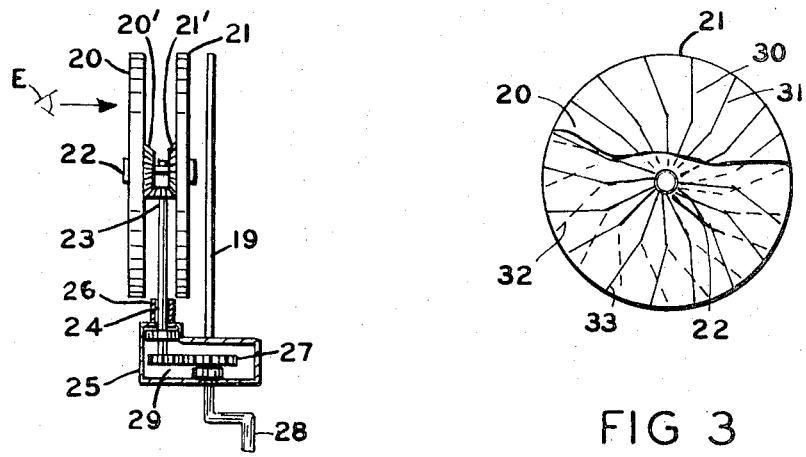
FIG. 3 is an elevation view of another embodiment of the invention using discs.
FIG. 4 is a side view of the embodiment of FIG. 3.

FIGS. 3 and 4 illustrate another embodiment of the invention using a pair of discs 20 and 21 which are rotatably mounted on the axle 22. The disc 20 has a gear 20' and the disc 21 has a gear 21' which mesh with gear 23, which is mounted on the shaft 24. A light colored backstop 19 is connected to handle base 25. The shaft 24 is rotatably mounted in the handle 26, which is fixedly mounted on the handle base 25 at the bottom end, and which is rotatably connected on its upper end to the axle 22. The spinner 28 is rotatably mounted on the handle base 25 and connected to shaft 24 by gears 27, 29.

The disc 21 has a plurality of generally radial lines 30, 31, etc., and the disc 20 has a plurality of generally radial lines 32, 33, etc. The lines are preferably evenly spaced around the axle 22 of the discs. The lines of one disc are oppositely slanted to those of the other disc so that when the eye E of the viewer looks at the discs, as illustrated, the lines cross. When the device is held in one hand by means of the handle 26 and the spinner 28 is operated by the other hand, then the discs will spin in opposite directions and the viewer in eye position E will see the lines crossing each other, which creates a pleasing illusion or illusions, depending upon the speed or the spinning, and in many cases, also provides the illusion of motion, namely that the device is moving up or down, sideways, or expanding and contracting.

The lines and discs may also be made of different colors, preferably bright colors to create a view of various changing color pattern combinations which are pleasant and which create optical illusions. The color patterns would tend to break up into different color illusions of infinite variations depending upon the speed of the spinning. Various other lines and shapes may be substituted for the lines, and additional rings or discs may be added.

Figure 5:
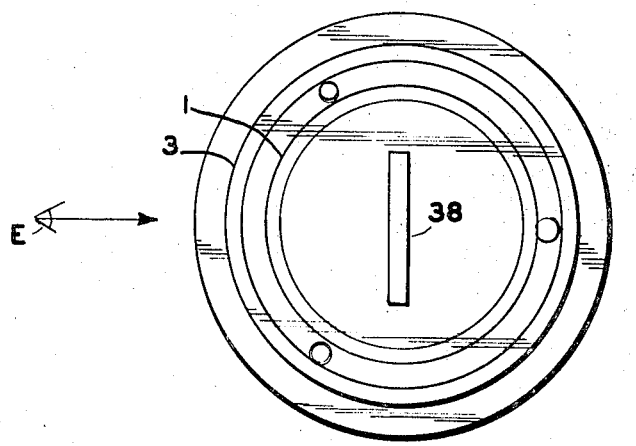
FIG. 5 is a plan view of another embodiment of the invention.
Figure 6:
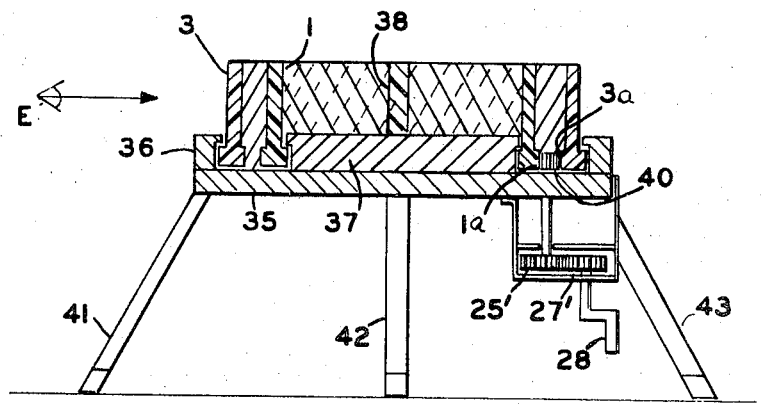
FIG. 6 is an elevation view, partially in section, of the embodiment of FIG. 5.

FIGS. 5 and 6 show another embodiment of the invention wherein the inner ring 1 and the outer ring 3 are mounted on a base 35 in a groove formed between the lip 36 of the base and a stationary center block 37. A stationary backstop 38, preferably white or a light color, is mounted to provide a suitable background for viewing by the eye E. The inner ring 1 has a gear 1a in its outer edge and the outer ring 3 has a gear 3a cut on its inner lip, and these gears mesh with the pinion gear 40, which is connected to the spinner 28 by means of the gears 27' and 25'. The apparatus is held up by the legs 41, 42, and 43.

Many modifications may be made by those who desire to practice the invention without departing from the scope thereof which is defined by the following claims.

I claim:

1. An optical illusion toy device comprising a transparent member having a plurality of lines extending in one general direction and a second transparent member having a plurality of opaque parallel lines extending in a direction across the lines of said first member,
   means to mount said members co-axially and rotatably, and
   means connected to rotate said members in opposite directions.

2. Apparatus as in claim 1 wherein said members are ring members.

3. Apparatus as in claim 1 wherein said members are discs.

4. Apparatus as in claim 2 wherein said lines are parallel.

5. Apparatus as in claim 3 wherein said lines are generally radial.

6. Apparatus as in claim 1 having a backstop of light color to enhance viewing.

References Cited

UNITED STATES PATENTS

| | | | |
|---|---|---|---|
| 1,140,675 | 5/1915 | Gottschalk et al. | 40—106.52 |
| 1,382,227 | 6/1921 | Pyper | 40—106.53 |
| 1,869,276 | 7/1932 | Precourt | 46—47 |
| 2,078,142 | 4/1937 | Jones | 40—106.53 |
| 2,272,946 | 2/1942 | Hotchner | 40—106.53 |
| 3,184,872 | 5/1965 | Way | 40—106.53 |
| 3,235,987 | 2/1966 | Yates | 40—106.51 |

RUSSELL R. KINSEY, Primary Examiner

D. L. WEINHOLD, JR., Assistant Examiner